(12) United States Patent
Hwang et al.

(10) Patent No.: US 11,456,084 B2
(45) Date of Patent: Sep. 27, 2022

(54) DEVICE FOR REMOVING SHIELDING BALLS FROM CALANDRIA OF HEAVY WATER NUCLEAR REACTOR

(71) Applicant: KOREA HYDRO & NUCLEAR POWER CO., LTD., Gyeongju-si (KR)

(72) Inventors: Young Hwan Hwang, Daejeon (KR); Seok-Ju Hwang, Daejeon (KR); Mi-Hyun Lee, Daejeon (KR); Cheon-Woo Kim, Daejeon (KR)

(73) Assignee: KOREA HYDRO & NUCLEAR POWER CO., LTD., Gyeongju-Si (KR)

( * ) Notice: Subject to any disclaimer, the term of this patent is extended or adjusted under 35 U.S.C. 154(b) by 0 days.

(21) Appl. No.: 17/277,769

(22) PCT Filed: Sep. 20, 2019

(86) PCT No.: PCT/KR2019/012269
§ 371 (c)(1),
(2) Date: Mar. 19, 2021

(87) PCT Pub. No.: WO2020/060309
PCT Pub. Date: Mar. 26, 2020

(65) Prior Publication Data
US 2021/0350944 A1    Nov. 11, 2021

(30) Foreign Application Priority Data

Sep. 21, 2018 (KR) .......................... 10-2018-0114255

(51) Int. Cl.
*G21D 1/00* (2006.01)
*G21C 11/00* (2006.01)

(52) U.S. Cl.
CPC ............. *G21D 1/003* (2013.01); *G21C 11/00* (2013.01)

(58) Field of Classification Search
CPC ................................. G21D 1/003; G21C 11/00
USPC ..................................................... 376/260, 366
See application file for complete search history.

(56) References Cited

FOREIGN PATENT DOCUMENTS

| CA | 2766472 | 7/2012 | |
|---|---|---|---|
| CA | 2766472 C | * 1/2018 | .......... G21C 17/017 |
| EP | 0419971 | 4/1991 | |
| JP | 63168597 | 7/1988 | |
| JP | 2001-004776 | 1/2001 | |
| JP | 2011-220736 | 11/2011 | |
| JP | 2013-134226 | 7/2013 | |
| KR | 10-0355056 | 10/2002 | |
| KR | 10-0356295 | 10/2002 | |
| KR | 10-1859359 | 5/2018 | |

\* cited by examiner

*Primary Examiner* — Jack W Keith
*Assistant Examiner* — Daniel Wasil
(74) *Attorney, Agent, or Firm* — Lex IP Meister, PLLC

(57) ABSTRACT

A device for removing shielding balls from calandria of a heavy water reactor is provided. The device includes a head for moving the shielding balls positioned inside of an end shield of the calandria to an outside of the end shield; and a mover for moving the head to the end shield of the calandria. The head includes a head body, an opening former installed on the head body and configured to form an opening in the end shield, and a gate installed on the head body and configured to control an amount of the shielding balls discharged to the outside through the opening.

7 Claims, 4 Drawing Sheets

DEVICE FOR REMOVING SHIELDING BALLS FROM CALANDRIA OF HEAVY WATER NUCLEAR REACTOR

TECHNICAL FIELD

The present invention relates to a device for capturing a shielding ball for a heavy water reactor.

BACKGROUND ART

In general, a calandria is a cylinder for injecting nuclear fuel to a reactor in a nuclear power plant in a heavy water reactor type, and has a cylinder pipe structure for injecting nuclear fuel during normal driving of the power plant and discharging combusted nuclear fuel bundle.

A shielding ball and cooling water in an end shield of the calandria must be separated to the outside and captured in advance when the heavy water reactor is decommissioned. However, the shielding ball and the cooling water are activated, so it is difficult for a worker to directly separate and capture them.

DISCLOSURE

The present invention has been made in an effort to provide a device for capturing a shielding ball for a heavy water reactor for separating and capturing a shielding ball for a heavy water reactor without a worker's exposure to radiation.

An embodiment of the present invention provides a device for capturing a shielding ball for a heavy water reactor, including: a head for separating a shielding ball positioned inside an end shield of a calandria of a heavy water reactor to an outside; and a mover for moving the head to the end shield of the calandria, wherein the head includes a head body, an opening former installed on the head body and forming an opening in the end shield, and a gate installed on the head body and controlling an amount of movement of the shielding ball discharged to the outside through the opening.

The device may further include a camera installed in the head body and setting coordinates of the opening former.

The gate may have an aperture structure or a sliding structure.

A lower portion of the head body may be installed to be inclined, and a tilt angle of the lower portion may be controllable.

The device may further include a sealer positioned on a front portion of the head body and closely attaching the head body and the end shield.

The mover may include: a capture unit for capturing the shielding ball; and a transfer unit for moving the capture unit.

According to the embodiment, the shielding ball for a heavy water reactor may be safely and quickly separated and captured without the worker's exposure to radiation according to remote control by using the device for capturing a shielding ball for a heavy water reactor.

MODE FOR INVENTION

Figure 1:
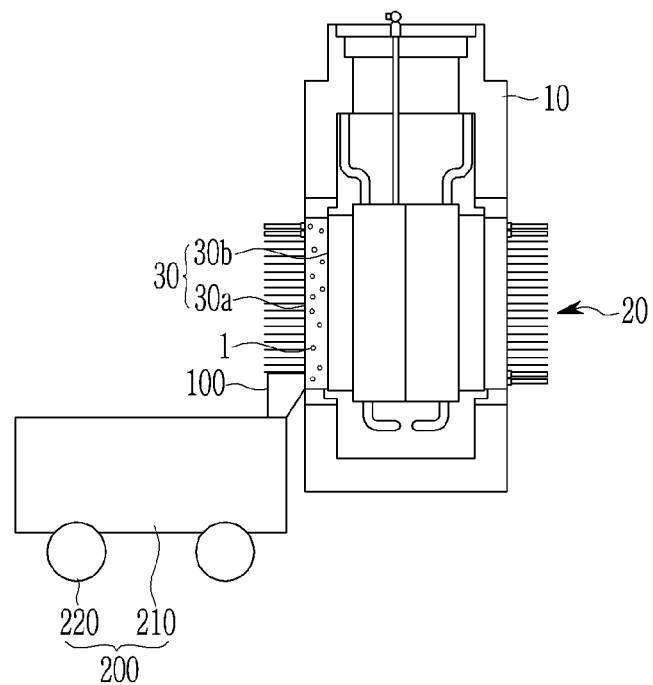
FIG. 1 shows a lateral side of a state in which a device for capturing a shielding ball for a heavy water reactor according to an embodiment is closely attached to a heavy water reactor.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Parts that are irrelevant to the description will be omitted to clearly describe the present invention, and the same elements will be designated by the same reference numerals throughout the specification.

The size and thickness of each configuration shown in the drawings are arbitrarily shown for better understanding and ease of description, but the present invention is not limited thereto.

Figure 2:
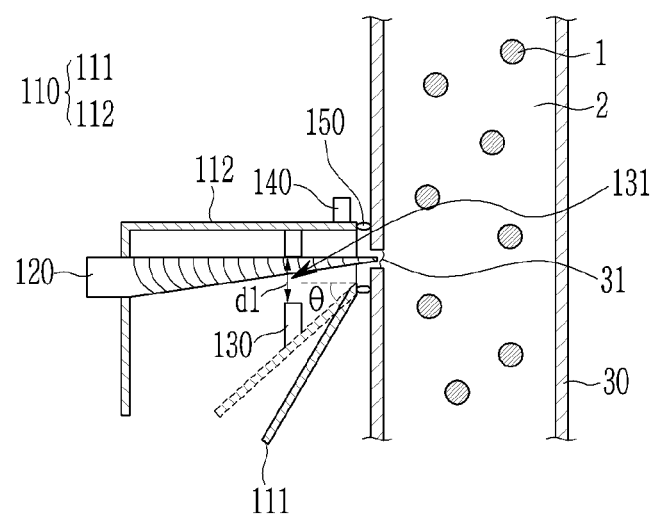
FIG. 2 shows an enlarged view of a head of a device for capturing a shielding ball for a heavy water reactor according to an embodiment.
Figure 3:
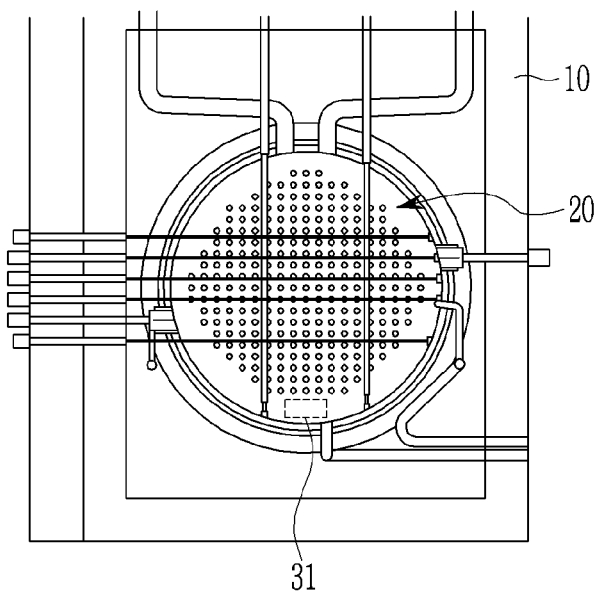
FIG. 3 shows a front view of a heavy water reactor showing a position to which a head of a device for capturing a shielding ball for a heavy water reactor is closely attached according to an embodiment.

FIG. 1 shows a lateral side of a state in which a device for capturing a shielding ball for a heavy water reactor according to an embodiment is closely attached to a heavy water reactor, FIG. 2 shows an enlarged view of a head of a device for capturing a shielding ball for a heavy water reactor according to an embodiment, and FIG. 3 shows a front view of a heavy water reactor showing a position to which a head of a device for capturing a shielding ball for a heavy water reactor is closely attached according to an embodiment.

As shown in FIG. 1 to FIG. 3, the device for capturing a shielding ball for a heavy water reactor according to an embodiment includes a head 100, and a mover 200 for moving the head 100 to be near the end shield 30 of the calandria 20 of the heavy water reactor.

The head 100 may separate the shielding ball 1 and the cooling water 2 positioned inside the end shield 30 of the calandria 20. The calandria 20 is positioned inside a shielding concrete 10 of the heavy water reactor. The end shield 30 corresponds to a region between a calandria tube sheet 30b and a fueling tube sheet 30a. A plurality of shielding balls 1 and cooling water 2 for shielding are filled in the end shield 30. The shielding ball 1 may be a ball made of carbon steel, and the cooling water 2 may be hard water.

The head 100 may include a head body 110, an opening former 120 installed in the head body 110, a gate 130, a camera 140, and a sealer 150.

The head body 110 includes an upper portion 112 for covering the opening former 120 and the gate 130, and a lower portion 111 installed to be inclined from the upper portion 112 with a predetermined tilt angle ($\theta$).

The opening former 120 may contact the end shield 30 to form an opening 31 in the end shield 30. A plurality of shielding balls 1 and cooling water 2 may be discharged outside the end shield 30 through the opening 31 of the end shield 30. In the present embodiment, a drill is exemplified as the opening former, and without being limited thereto, various types of devices are usable such as a laser beam device as long as the opening 31 is formed in the end shield 30.

The gate 130 may have an aperture structure for controlling a size d1 of the via-hole 131. Therefore, amounts of movement of the shielding balls 1 and the cooling water 2 discharged to the outside through the opening 31 may be controlled by using the gate 130. That is, when the size d1 of the via-hole 131 of the gate 130 is set to be big, the amounts of movement of the shielding balls 1 and the cooling water 2 discharged to the outside may increase, and when the size d1 of the via-hole 131 of the gate 130 is set to be small, the amounts thereof may decrease.

The camera 140 may be positioned on a front portion of the head body 110 and may set coordinates of the opening former 120 according to remote control. Therefore, the opening former 120 may be provided in the accurate position of the end shield 30 by using the camera 140, thereby forming an opening 31 in a lower portion of the end shield 30. Further, the opening 31 may be formed by accurately monitoring a status inside the end shield 30 by use of the camera 140.

The sealer 150 is positioned on a front portion of the head body 110 and it may seal the head body 110 and the end shield 30. That is, the sealer 150 temporarily seals the head body 110 and the end shield 30 so that the shielding balls 1 and the cooling water 2 discharged while the front portion of the head body 110 is closely attached to the lower portion of the end shield 30 may not leak. The sealer 150 may include a material such as rubber.

In addition, the mover 200 may include a capture unit 210 for capturing the shielding balls 1 and the cooling water 2, and a transfer unit 220 for moving the capture unit 210.

The capture unit 210 is positioned near the calandria 20 of the heavy water reactor, so it may safely capture the shielding balls 1 and the cooling water 2 discharged to the outside by the head 200, without leakage.

The lower portion 111 of the head body 110 is installed to be inclined with a predetermined tilt angle (θ), so the shielding balls 1 and the cooling water 2 discharged to the outside move to the capture unit 210 along the lower portion 111.

The tilt angle (θ) of the lower portion 111 is adjustable. Therefore, moving speeds of the shielding balls 1 and the cooling water 2 may be controlled by controlling the tilt angle (θ) of the lower portion 111. That is, when the tilt angle (θ) of the lower portion 111 is small, the moving speed of the shielding balls 1 and the cooling water 2 is slow, and when the tilt angle (θ) of the lower portion 111 is big, the moving speed of the shielding balls 1 and the cooling water 2 becomes big.

As described above, the shielding ball 1 for a heavy water reactor may be safely and quickly separated to the outside of the end shield 30 and captured without the worker's exposure to radiation according to remote control by use of the device for capturing the shielding ball for a heavy water reactor according to an embodiment of the present invention.

The gate has the aperture structure according to the embodiment, and other embodiments including a gate having a sliding structure are possible.

A device for capturing a shielding ball for a heavy water reactor according to another embodiment of the present invention will now be described with reference to FIG. 4.

Figure 4:
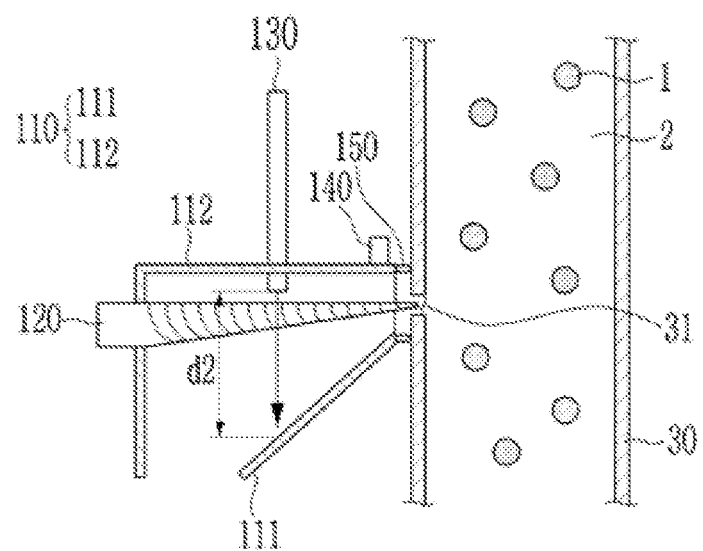
FIG. 4 shows an enlarged view of a head of a device for capturing a shielding ball for a heavy water reactor according to another embodiment.

FIG. 4 shows an enlarged view of a head of a device for capturing a shielding ball for a heavy water reactor according to another embodiment.

Another embodiment to be described with reference to FIG. 4 substantially corresponds to the embodiment described with reference to FIG. 1 to FIG. 3 except the structure of the gate, so no repeated descriptions will be provided.

As shown in FIG. 4, a head 100 of the device for capturing a shielding ball for a heavy water reactor according to another embodiment of the present invention may include a head body 110, an opening former 120 installed in the head body 110, a gate 130, a camera 140, and a sealer 150.

The gate 130 may have a sliding structure. Therefore, the amount of movement of the shielding balls 1 and the cooling water 2 discharged to the outside through the opening 31 may be controlled by using the gate 130. That is, when a distance d2 between the gate 130 and the lower portion 111 of the head body 110 is big, the amount of movement of the shielding balls 1 and the cooling water 2 discharged to the outside of the end shield 30 may become big, and when the gate 130 slides and the distance d2 between the gate 130 and the lower portion 111 of the head body 110 becomes small, the amount of movement of the shielding balls 1 and the cooling water 2 discharged to the outside of the end shield 30 may become small.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A device for capturing a shielding ball for a heavy water reactor, comprising:
    a head for separating shielding balls positioned inside an end shield of a calandria of a heavy water reactor to an outside of the end shield; and
    a mover for moving the head to the end shield of the calandria,
    wherein the head includes
    a head body,
    an opening former installed on the head body and configured to cut the end shield for creating an opening in the end shield, and
    a gate installed on the head body and configured to control an amount of the shielding balls discharged to the outside through the opening.

2. The device of claim 1, further comprising
    a camera installed in the head body and setting coordinates of the opening former.

3. The device of claim 2, wherein
    the gate has an aperture of which size is controllable.

4. The device of claim 2, wherein
    the gate is slidable to control the amount of the shielding balls discharged to the outside.

5. The device of claim 2, wherein
    a lower portion of the head body is installed to be inclined, and
    the lower portion is movable to control a tilt angle of the lower portion.

6. The device of claim 3, further comprising
    a sealer positioned on a front portion of the head body and and configured to contact the end shield for sealing.

7. The device of claim 3, wherein
    the mover includes:
    a capture unit for capturing the shielding ball; and
    a transfer unit for moving the capture unit.

* * * * *